(12) United States Patent
Ridgway

(10) Patent No.: US 6,369,614 B1
(45) Date of Patent: Apr. 9, 2002

(54) ASYNCHRONOUS COMPLETION PREDICTION

(75) Inventor: Stuart Alexander Ridgway, New Brunswick, NJ (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/579,855

(22) Filed: May 25, 2000

(51) Int. Cl.[7] .......................... H03K 19/00; H04J 3/06; G06F 13/14
(52) U.S. Cl. ...................... 326/93; 370/535; 710/52; 711/169
(58) Field of Search ............... 326/93, 95, 98

(56) References Cited

U.S. PATENT DOCUMENTS

| 5,920,899 | A | * | 7/1999 | Chu ........................ 711/169 |
| 6,009,107 | A | * | 12/1999 | Arvidsson et al. ........ 370/535 |
| 6,038,656 | A | * | 3/2000 | Martin et al. ............. 712/211 |
| 6,055,285 | A | * | 4/2000 | Alston ...................... 375/372 |
| 6,064,232 | A | * | 5/2000 | Relph ........................ 326/93 |
| 6,128,678 | A | * | 10/2000 | Masteller .................... 710/52 |

* cited by examiner

Primary Examiner—Michael Tokar
Assistant Examiner—Vibol Tan
(74) Attorney, Agent, or Firm—Philip H. Albert; Townsend and Townsend and Crew LLP

(57) ABSTRACT

A stage of a multi-stage, self-timed datapath circuit calculates one or more data outputs as a function of one or more data inputs. Data outputs are calculated by multiple logical elements that operate simultaneously and produce internal results as inputs to other logical elements within a stage. An internal completion signal generator detects completion of a predetermined set of the internal results calculation and, in response, generates an completion signal for each internal result detected. A done signal generator receives the completion signals and, in response to one or more preselected combinations of the completion signals, provides a done signal. The done signal is generated with a predetermined delay such that the delay is at least as long as a time it takes for the stage to calculate a final result.

11 Claims, 7 Drawing Sheets

ASYNCHRONOUS COMPLETION PREDICTION

BACKGROUND OF THE INVENTION

The present invention generally relates to asynchronous circuits, and more particularly to an improved asynchronous circuit having lower latency and delay.

Signals propagating through multi-stage logic circuits fall into one of two general categories: data or control. Data represents the informational content passed from one stage to another through the integrated circuit chip. Control signals manage and direct the logical operations of individual stages in the context of the overall operation of a multi-stage logic circuit. A goal in the design of most multi-stage logic circuits is to optimize the speed of the former, while minimizing overhead costs in delay and complexity of the latter.

Advances in semiconductor fabrication technology allow increasingly larger numbers of logic stages to be placed on a single integrated circuit, and permit operation of such circuits at speeds greater than prior generations of circuits. Two known methodologies for the design of such circuits are known as a synchronous implementation and an asynchronous implementation. Synchronous designs are usually controlled by a global clock signal which causes all of the circuitry on the integrated circuit chip to operate in lockstep. While conceptually simple, such a design requires that the clock control cycle for all stages be set for the worst-case delay of data signals in any one stage.

Asynchronous designs use local control to determine when local stages operate, and the stages do not necessarily operate in synchrony with the other stages on the integrated circuit chip. As such, asynchronous designs eliminate the difficulty of distributing a clock "globally" across the integrated circuit, and also potentially offer improved speed, lower power consumption, and other benefits.

Asynchronous control schemes can be assigned to different broad categories depending on the amount of interaction between data and control. At one extreme is the case of "pure bundled" data, in which the data carries no information into the control. In circuits using pure bundled data, the delay of the control circuits must be accurately matched to the delay of the data path. A more general scheme can be called "data-dependent" timing, in which the data carries some control information that indicates when it is valid. This enables the control system to assure data validity before processing the data.

One way to minimize control overhead and improve data performance in an asynchronous circuit is with a process known as "completion detection," in which control logic generates a "done" signal when it detects that the data output is valid. In typical prior art examples, dual-rail output is generated for every input data bit, and it is required that both rails stay "off" until the correct value of the output is known. While this approach can improve the average-case performance, it adds both delay to the execution time required by the data path and complexity to the datapath circuit because the control logic must monitor each stage to determine whether the output calculation of each stage is valid before the validity of the entire datapath operation can be signaled.

SUMMARY OF THE INVENTION

This invention provides a stage in a multi-stage, asynchronous datapath circuit. The stage calculates one or more data outputs as a function of one or more data inputs. In accordance with the present invention, the stage includes digital logic having multiple logical elements that calculate both internal results for use as inputs to other logical elements within the stage and final results for use as inputs to other logical elements in a next stage. An internal completion signal generator is coupled with the digital logic, and detects completion by the digital logic of the internal results or final results calculations and, in response, generates a completion signal for each calculation result detected. A done signal generator receives the completion signals and, in response to one or more preselected combination of the completion signals, generates a done signal with a predetermined delay that is at least as long as a maximum delay until the one or more data outputs are calculated.

In accordance with an another embodiment of the present invention, a stage in a multi-stage, self-timed datapath circuit includes digital logic having multiple logical elements that receive one or more data inputs and calculate both internal results for use as inputs to other logical elements within the stage, and final results for use as inputs to other logical elements in a next stage. An internal completion signal generator, is coupled with the digital logic and detects completion by the digital logic of one or more of the internal results or final results calculations, and in response generates a completion signal for each calculation result detected. A done signal generator receives the completion signals, and in response to a preselected one of the completion signals, generates a done signal with a predetermined delay, wherein the predetermined delay is at least as long as a maximum delay until the one or more data outputs are calculated.

In accordance with yet another embodiment of the invention, a control circuit for a stage in a multi-stage, self-timed datapath circuit includes an internal completion signal generator that detects completion by the digital logic of an intermediate result of the multi-step calculation, and in response generates a completion signal. A done signal generator is responsive to the completion signal, and generates a done signal with a predetermined delay, where the predetermined delay is at least as long as a maximum time for the logical elements within the stage to calculate a data output.

In accordance with yet another embodiment of the present invention, a method of predicting completion of a total stage calculation includes the steps of dividing a plurality of logical elements into multiple sections, where each logical element outputs both internal results and final results, selecting at least one section, monitoring the at least one selected section for both internal results and final results, and in response to a predetermined number of results monitored, generating a completion signal with a delay. The delay is set to an estimate of a time for completion of the total stage calculation.

DESCRIPTION OF THE SPECIFIC EMBODIMENTS

Figure 1:
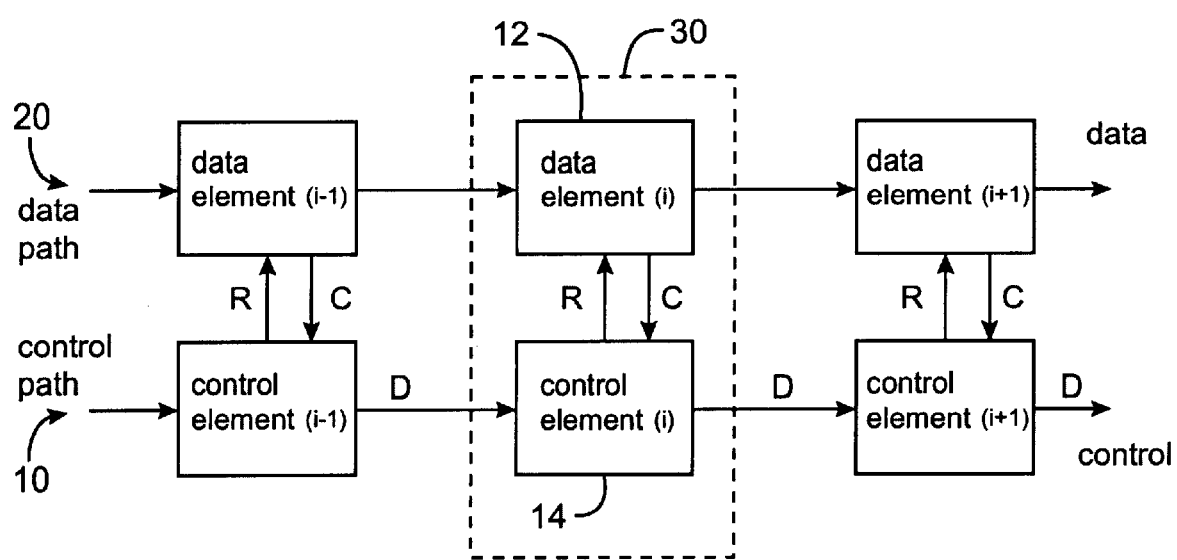
FIG. 1 is a block diagram of the control path and data path in an asynchronous circuit.

FIG. 1 is a simplified block diagram of an asynchronous circuit typical of the prior art, showing the interaction of a control path 10 and a data path 20. As shown, the circuit includes multiple stages 30, each having a data element 12, and a corresponding control element 14. In each stage the data element receives a request (R) signal from its corresponding control element. The request signal is provided to logic circuits within the data element to initiate logic operations of the data element. In response to a completion (C) signal received when all of the logic circuits in that stage's data element have completed performing their designed operations, a done (D) signal is supplied from the stage's control element to a subsequent control element. Each operation takes a different time to complete, and is accomplished at different intervals. The subsequent control element in the control path uses this done signal to generate the request signal to initiate operation in the subsequent stage's data element, and so on.

Figure 2:
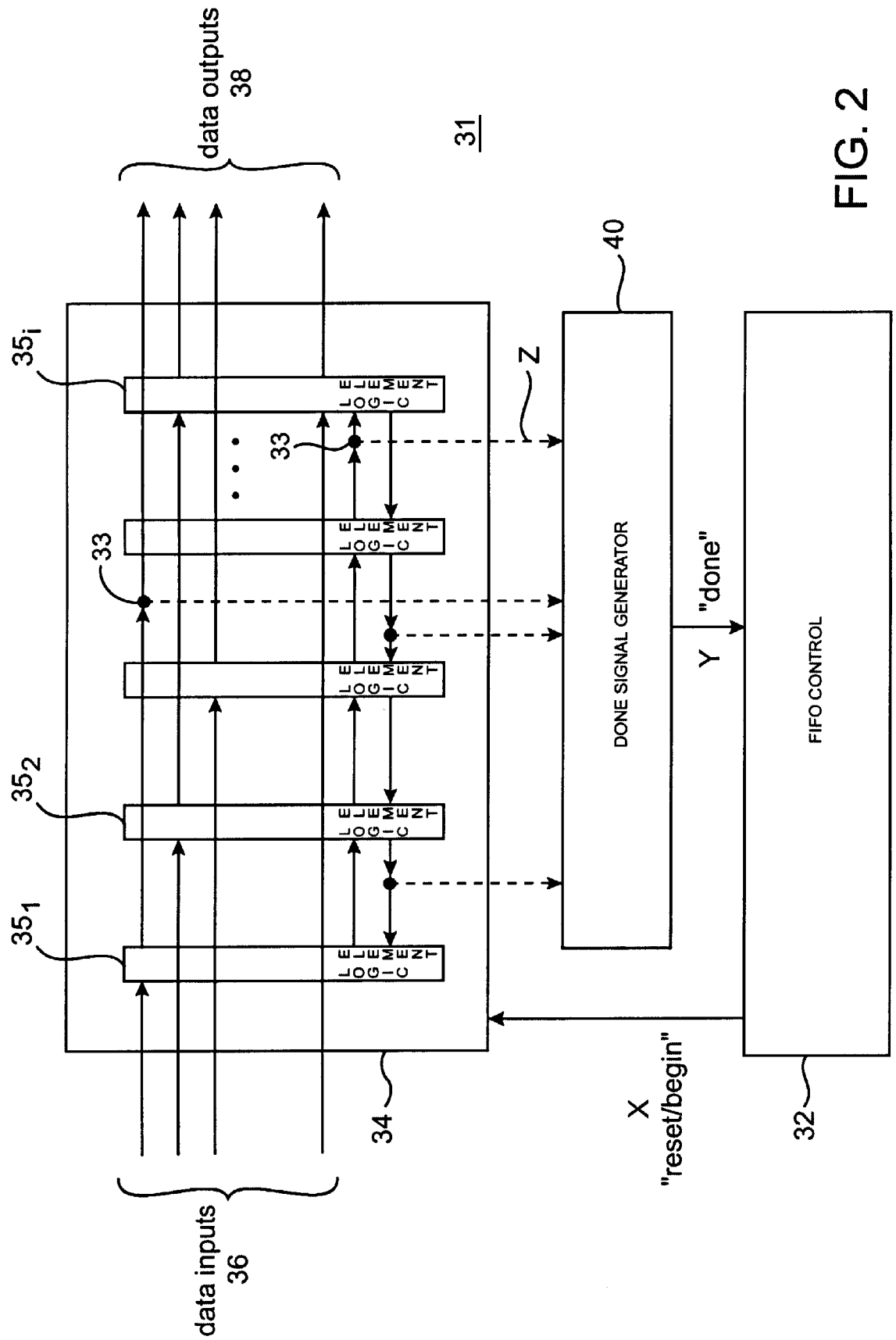
FIG. 2 is a simplified block diagram of a datapath stage of an asynchronous circuit with completion signaling components according to the invention.

FIG. 2 is a simplified block diagram of a stage 31 of an asynchronous pipeline showing the interaction between data and control according to an embodiment of the present invention. The control includes a FIFO control block 32 and a done signal generator 40. Stage 31 in the pipeline also includes a datapath block 34, the operation of which is partly controlled by control block 32. The control block provides a reset/begin signal X to the datapath block which signals to the datapath that its data inputs 36 are valid, and accepts a done signal Y that signals the validity of the data outputs 38 of the datapath block. After sending the reset/begin signal, the FIFO control block waits for a next done signal Y before it sends another reset/begin signal. The behavior of the control or the nature of the pipeline in which this stage is embedded need not be further explained for a complete understanding of the present invention.

The datapath block 34 includes a number of logical elements $35_{1-i}$ that operate concurrently, and which each perform a specific logical function. Each logical element 35 may have data inputs from both outside the stage and from other logical elements within the stage. Inputs from within the stage are considered to be "internal results," as they are an intermediate result generated by a logical element before being sent outside of datapath block stage 34 as data output 38. Inputs from the outside are presumed to be valid when the signal to begin the calculation is received, but there must be a mechanism to determine the validity of the internal input results. In conventional datapath circuits, this determination is usually done through some sort of dual-rail encoding.

According to an embodiment of the present invention, when the values of the valid inputs to a logical element 35 are sufficient to determine an output of that element, the logical element generates a valid output result without waiting further. In this way, the time it takes for any particular output to be determined depends on the value of the input data. Completion detection circuits 33 are coupled to any desired internal results or data outputs, and generate a completion signal upon detection of a valid internal result. A final result is output on data outputs 38 after the entire calculation in datapath block 34 is complete. Arrangement and location of the logical elements, and selection of which internal results to monitor for completion is shown in FIG. 2 for illustration only.

Instead of waiting for all of the data outputs of a stage to become valid, as is done in completion detection systems of conventional datapath circuits, the validity of a set of intermediate results or output bits is monitored with a done signal generator 40. The done signal generator 40 waits for validity to be signaled on various combinations of its inputs, and delays its output by a sufficient amount such that the output data bits are guaranteed to be valid when the done signal Y is generated.

The approach according to the present invention is highly flexible and can deliver several distinct benefits. First, a combination of internal results monitored by the done signal generator 40 may become valid long enough before the outputs are valid, so that the latency of the completion prediction block is entirely hidden. Second, a relatively simple completion signaling circuit that monitors a small number of intermediate results may be employed, thus reducing the amount of hardware required relative to full completion detection.

Figure 3:
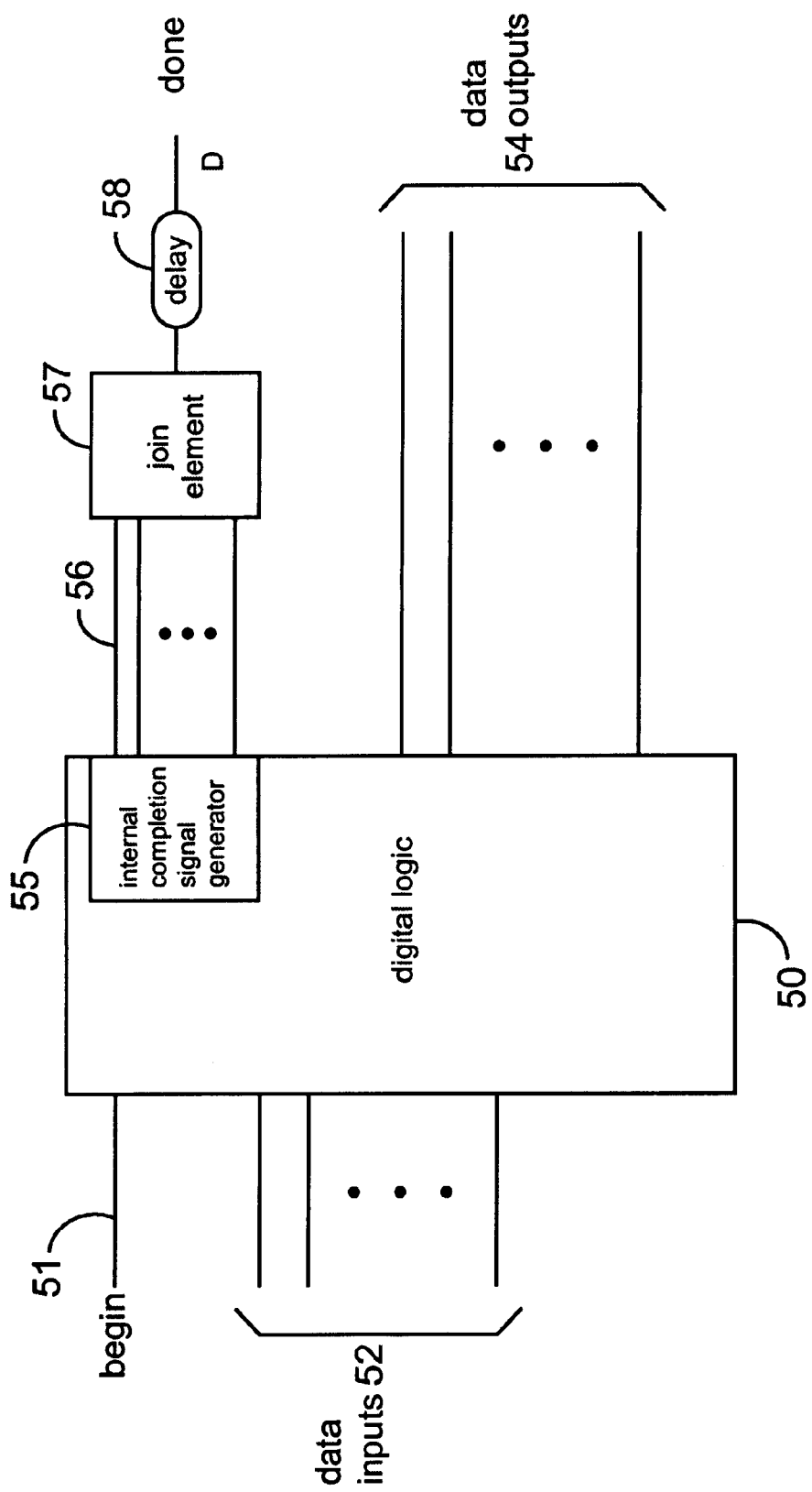
FIG. 3 is a block diagram of a preferred embodiment of the invention.

FIG. 3 is a circuit diagram of a stage according to an embodiment of the present invention illustrating the done signal generator as a join element 57. Digital logic 50 receives data inputs 52 from a previous stage, and calculates data outputs 54 according to a calculation. A "begin" signal 51 tells the digital logic 50 when it may begin to perform its function, usually when all of the data inputs 52 are valid. An internal completion signal generator 55, which may be configured from logic gates provided within the same integrated circuit as the digital logic 50, detects completion of certain intermediate steps of the calculation. The internal control signal generator (ICSG) 55 functions according to internal signal generator 33 of FIG. 2, and generates internal completion signals 56. The join element ("J-element") 57 generates a done signal (D) after a predetermined delay 58 is added. The J-element generates an output signal when every one of its multiple inputs are valid.

In a logic gate stage that uses level signaling, where TRUE indicates that an intermediate result is complete, the J-element functions as a multi-input AND gate. In transition signaling, where any transition from LOW to HIGH or HIGH to LOW indicates that a result is complete, the J-element functions as a multiple-input C-element. An n-input C-element is a logic element with n inputs and one output. If all of the inputs are HIGH, then the output is driven HIGH. If all of the inputs are LOW, then the output is driven LOW. Otherwise, if different inputs have different values, then the output maintains its previous value. Thus, there will only be a transition on the output of a C-element when there has been a transition on every one of its inputs, giving it the function of a J-element for transition signaling. It will be understood by one skilled in the art that the logic gates that comprise the control element of the present invention may be implemented with other well-known logic functions. The delay 58 is configured such that the done signal is generated at a time late enough for the digital logic to provide valid data outputs 54.

Figure 4:
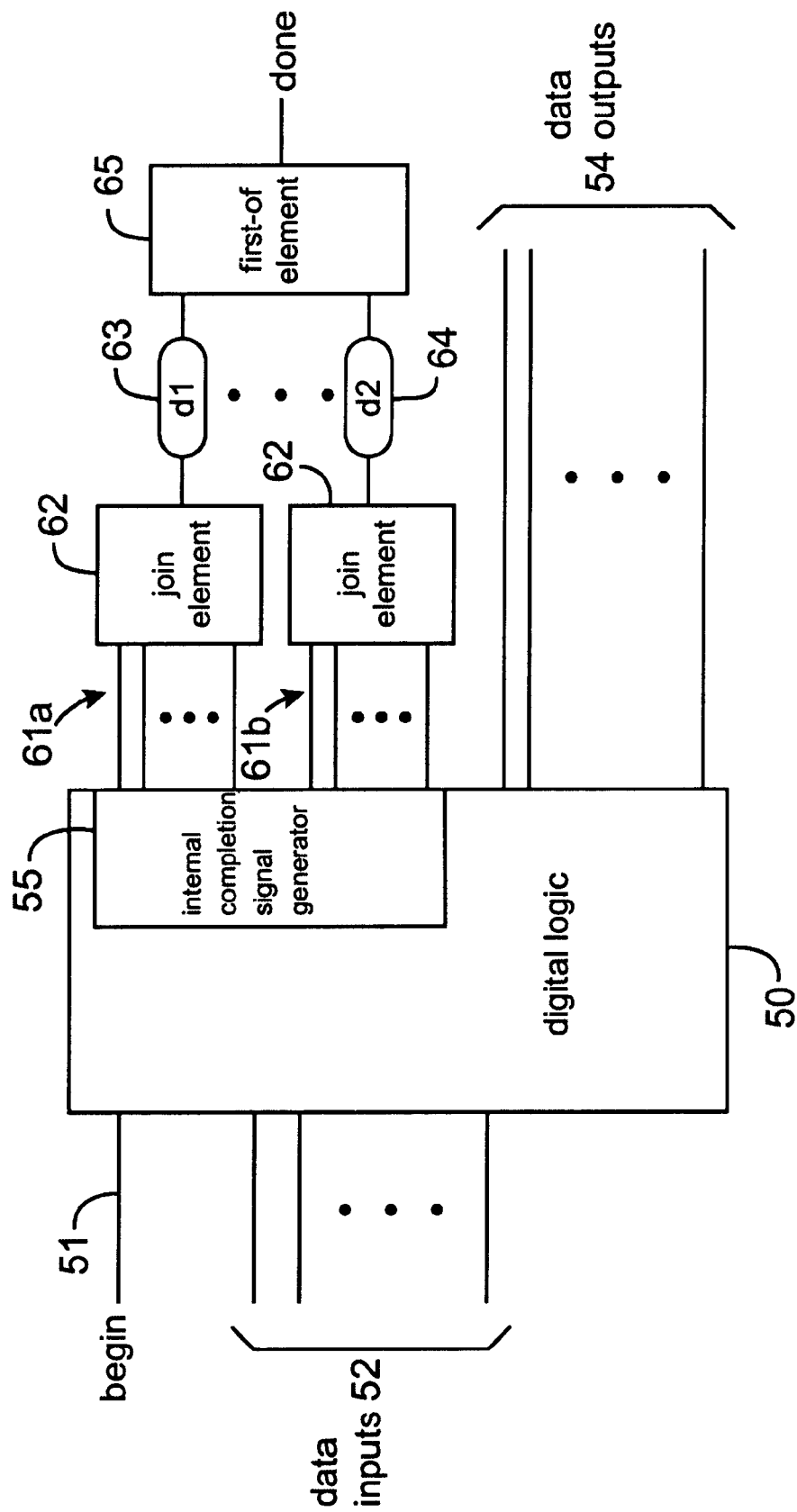
FIG. 4 is a block diagram of an alternative preferred embodiment of the invention.

FIG. 4 illustrates a circuit according to an alternative embodiment of the present invention. The circuit includes digital logic 50, data inputs 52, data outputs 54, and "begin" signal 51 as described above with reference to FIG. 3. In the circuit, internal completion signal generator 55 generates multiple sets of internal completion signals, illustrated here by reference numerals 61a and 61b. Only two sets of internal completion signals are shown for ease of reference and simplicity of explanation, however it should be understood that many sets of internal completion signals may be detected and generated. What must be known is the maximum delay from completion of the intermediate step or steps selected for detection until completion of the entire calculation and generation of valid data outputs. This known maximum delay defines the delay that must be added to the control element in order to generate a sufficiently timely done signal.

Join elements 62, as described above, generate separate done signals after a delay. The delay added for each path, shown as $d_1$ and $d_2$, reference numerals 63 and 64, respectively, may be the same or different depending on the intermediate step from which the done signal is generated. A first-of element ("F-element") 65, a logic element, sends a done signal whenever the first of the separate delayed done signals arrives at an input. The final done signal from F-element 65 may be scaled and timed with its own delay, if desired or required. Any delay added after F-element 65 will be added to which ever delay is associated with the first received separate done signal input to the F-element.

For level signaling, the F-element is implemented as a multiple-input OR gate. For transition signaling, the F-element is implemented as a "one-all" logical circuit. Each set of internal completion signals in FIG. 4 represents a particular completion condition. Each completion condition is satisfied as soon as all of the results that are being monitored are complete. The done signal generator begins to generate its done signal whenever at least one of the completion conditions is satisfied.

Referring back to FIG. 3, there is illustrated an embodiment of the present invention where there is only one completion condition. For level-signaling in which a completion is signaled with a HIGH voltage level, the done signal generator is implemented with a single multi-input AND gate. The embodiment of the invention illustrated in FIG. 4 represents a case where there are several completion conditions. For level-signaling, the done signal generator is implemented with an AND gate for each completion condition, followed by an OR gate that detects when any one of the completion conditions is satisfied.

A Boolean logic function which calculates a single output from a number of inputs is "monotone-increasing" when, for any possible value for the inputs, a rising transition on an input either leaves the output unchanged or causes a rising transition on the output. A circuit that calculates such a Boolean logic function is hazard-free when it is implemented in such a way that there are no spurious transitions on the output. In other words, as various inputs are raised HIGH, there can only be a single transition from LOW to HIGH at the output. For the case of level-signaling, the done detector can consist of any hazard-free implementation of a monotone increasing Boolean function. Such function can be implemented by a circuit of the form illustrated in FIG. 4.

Any circuit that calculates a single output from its inputs and is constructed solely of hazard-free AND gates and OR gates will be a hazard-free implementation of a monotone-increasing function, and can serve as the logic for a done detector. By replacing each AND gate with a C-element, and replacing each OR gate with a ONE-ALL element, the resulting circuit will serve as the logic for a transition-signaling done detector. In either of these cases, one must insert delays wherever necessary to ensure that the total delay for each completion condition is greater than the maximum delay required for the remainder of the datapath calculation to complete after that condition is satisfied.

Figure 5:
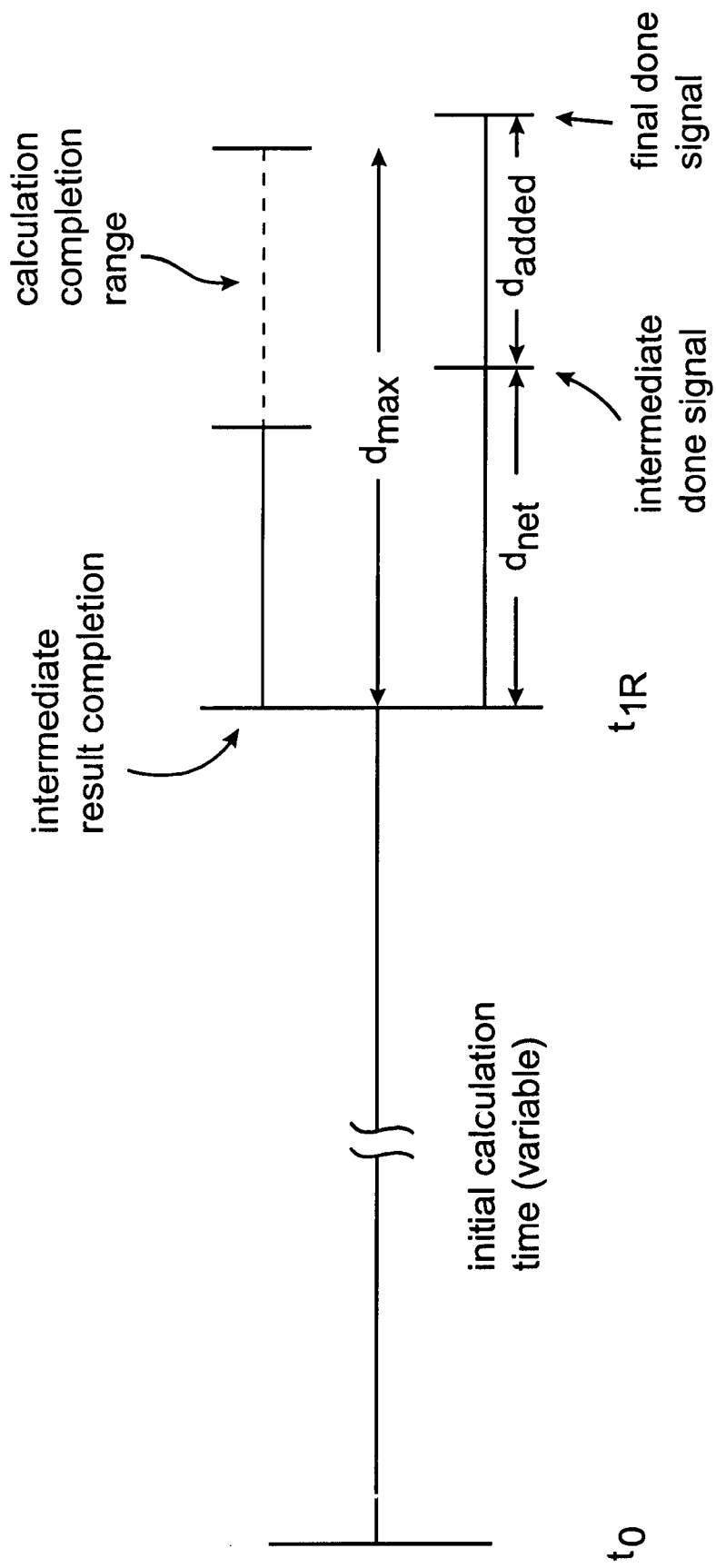
FIG. 5 shows a timing diagram illustrative of a preferred embodiment of the present invention.

FIG. 5 is a timing diagram to illustrate the operation of the embodiments shown in FIGS. 2–4. An initial calculation time represents a time for the digital logic to perform a group the initial portion of the calculation, before any "completion conditions" are satisfied. At time $T_{IR}$, one of the completion conditions is satisfied and a result is detected. The delay $d_{max}$ represents a maximum delay for the digital logic to complete the remainder of the calculation after completion of the selected intermediate calculation step. The delay $d_{net}$ represents inherent latency for the internal completion signal generator to detect completion of the intermediate step and generate an internal completion signal. The delay $d_{added}$ represents a predetermined delay added to the internal completion signal, before a done signal is generated, so that the done signal is generated at a time that guarantees the entire multi-step calculation will be completed.

Figure 6:
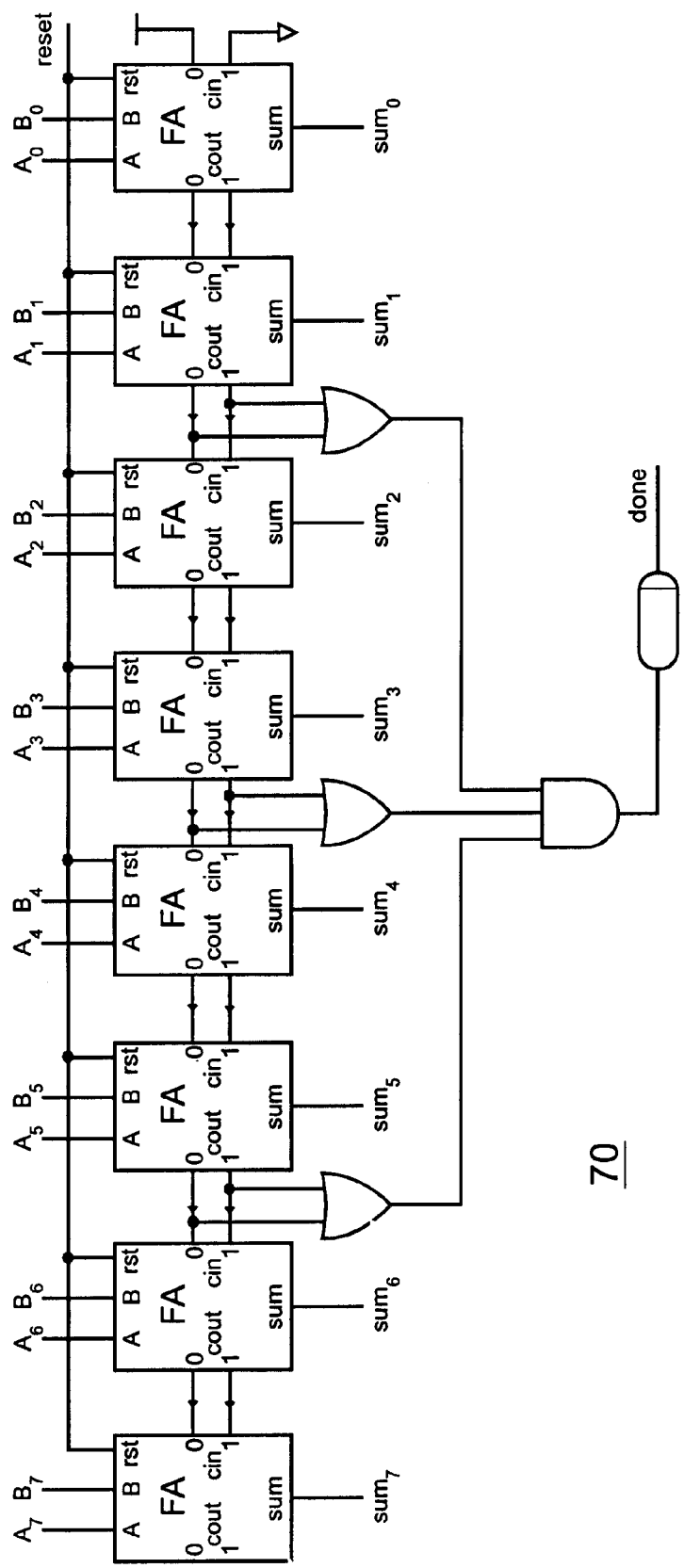
FIG. 6 is a circuit schematic of a specific application of an embodiment of the present invention.

In accordance with the foregoing description of the present invention, a specific exemplary embodiment of a completion prediction system is shown with reference to FIG. 6. FIG. 6 is a circuit schematic of an asynchronous ripple-carry adder 70 with a dual-rail carry chain. A ripple carry adder has a relatively poor worst-case performance, because a carry signal might travel from the least significant bit to the most significant bit depending on the calculation performed in a stage. In a typical case, the delay will be substantially smaller; for random data, the length of the average longest carry propagation chain is less than $\log_2 n$, where (n) is the number of bits. Thus, when n is larger according to trends in integrated circuits, completion signaling greatly reduces delay for the average stage multi-step calculation. For example, for a 64-bit adder, the average delay for the carry chain is usually 6 carries, while the worst case will be 63 carries.

In the circuit shown in FIG. 6, any bit i of the ripple carry adder has five inputs: $A_i$ and $B_i$ (the ith bits of the two inputs to the adder), $cin1_i$ and $cin0_i$ (the TRUE and FALSE rails of the carry input, generated by bit i−1) and reset (a signal sent to all of the bits in the stage to clear the carry chain). The carry is encoded in a dual rail, one-hot encoding wherein both rails are LOW when idle, and the appropriate rail goes HIGH to indicate a known value. Each bit generates three outputs: $sum_i$ (bit i of the final sum), and $cout0_i$. The output $cout0_i$ equals $cin0_{i+1}$ and $cout1_i$ equals $cin1_{i+1}$, the dual rail carry output. The logic for the outputs of any bit are:

sum=cin XOR A XOR B $c_{out1}$=reset AND (A AND B OR cin1 AND (A XOR B)), and $c_{out0}$=reset AND (A AND B OR cin0 AND (A XOR B)).

In these equations, AND has precedence over XOR.

FIG. 6 includes a gate-level circuit for a completion predicting adder, according to the invention. Each cells labeled "FA" calculate the equations given above. The logic for sum assumes the carry rails are complementary, but should not dissipate static power when both rails are LOW. The logic for the output carry should not assume that the input carry rails are complementary, and needs to be hazard free, because the carry rails are used to generate the done signal. The reset signal goes low to quickly reset the entire carry chain, set both of the rails LOW, and reset the completion signal. For increased speed, the reset signal should also reset the completion network directly. The reset signal goes HIGH to begin the calculation with a new set of valid input data. Because there must be a start/reset signal, the adder could be implemented using dynamic pre-charged logic.

The completion condition evaluated in the circuit shown in FIG. 6 is that the carry outputs from bits 1, 3 and 5 be complete. When this is the case, then the maximum delay from the time that the completion condition is satisfied until the entire calculation is complete is equal to the delay from the carry input to the carry output of an "FA" cell plus the delay from the carry input to the sum output of a "FA" cell. This is so because if the carries from bits 1, 3, and 5 are complete, there is nowhere that two successive carry outputs can still be incomplete. Thus the explicit delay that must be added to the output of the AND gate in FIG. 6 is equal to the maximum delay given above, reduced by the delay of the completion signaling network, which is the delay of an OR gate followed by an AND gate.

Figure 7:
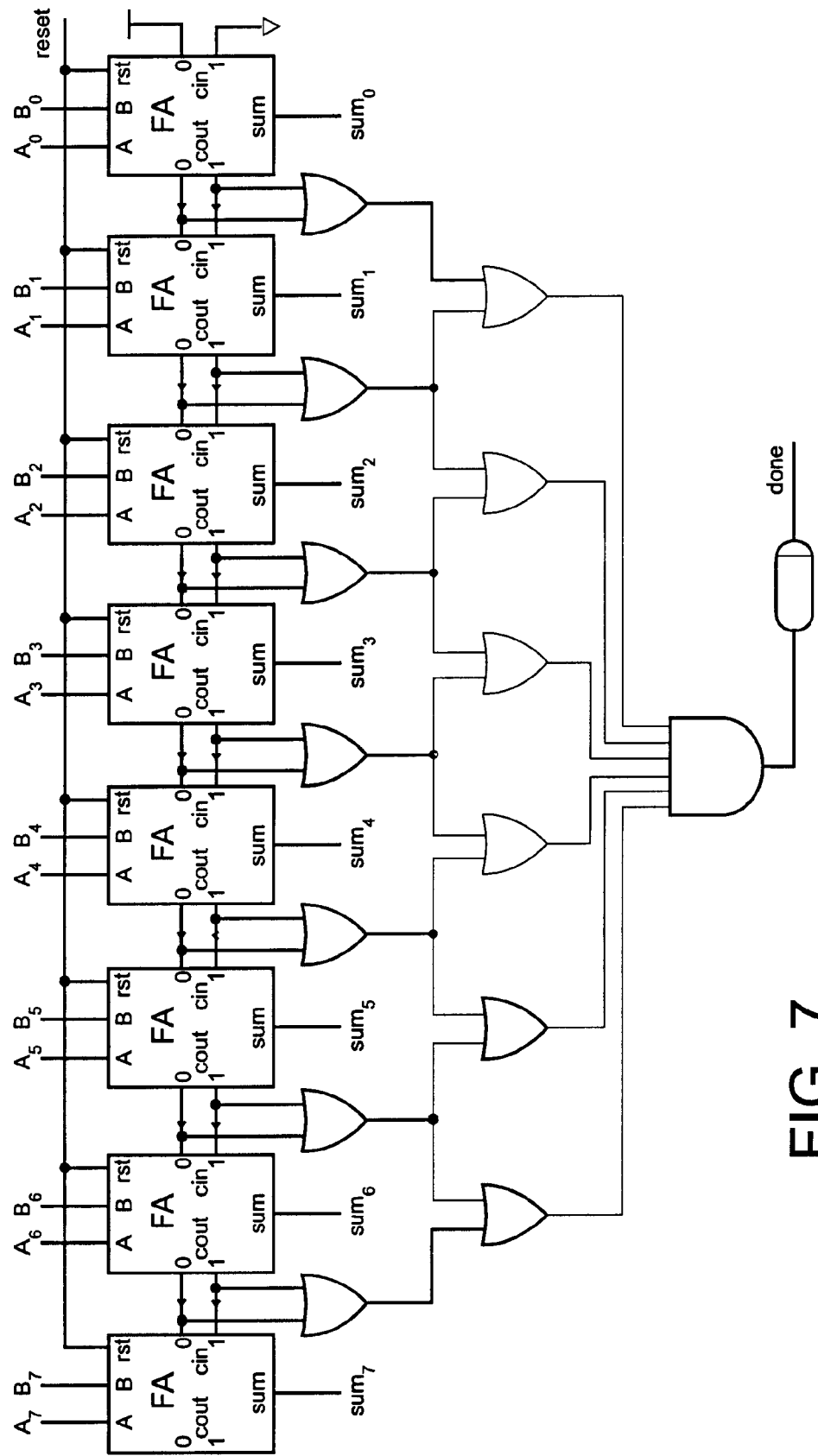
FIG. 7 is a circuit schematic of an alternative specific application of an embodiment of the present invention.

FIG. 7 shows an alternative exemplary embodiment of the invention for a ripple-carry adder implementation. The logic that calculates the final result is similar is to that of FIG. 6, but the done signal generator will detect any case such that no two adjacent bits have incomplete output carries. The maximum delay from the time that a completion condition is satisfied until the calculation is done is the same as that for the circuit in FIG. 6. The difference is that for some possible data input, a completion condition for FIG. 7 may be satisfied for some cases sooner than for FIG. 6, potentially allowing an earlier done signal. The tradeoff is that the done signal generator in FIG. 7 will have more delay—two OR gate delays followed by a six-input AND gate delay—and will require more hardware than the done signal generator in FIG. 6.

The preceding has been a description of the preferred embodiments of the invention. It will be appreciated that deviations and modifications can be made without departing from the scope of the invention, which is defined by the appended claims.

What is claimed is:

1. A stage in a multi-stage, self-timed datapath circuit that calculates one or more data outputs as a function of one or more data inputs, the stage comprising:

digital logic having multiple logical elements that calculate both internal results for use as inputs to other logical elements within the stage and final results for use as inputs to logical elements in a next stage;

an internal completion signal generator, coupled with the digital logic, that detects completion by the digital logic of calculation of the internal results, and in response generates completion signals for at least one detected internal result; and a done signal generator that receives the completion signals, and in response, generates a done signal with a predetermined delay after at least one predetermined combination of the completion signals has been received, wherein the predetermined delay is at least as long as a maximum delay until the one or more data outputs are calculated.

2. The stage according to claim 1, wherein the completion signals are voltage levels designated as "true" and generated by the internal completion signal generator to indicate that the result is complete, and the done signal generator calculates the AND of the completion signals.

3. The stage according to claim 1, wherein the completion signal is a transition signal generated by the completion signal generator to indicate that the result is complete, and the done signal generator includes one or more C-elements.

4. A stage in a multi-stage, self-timed datapath circuit, comprising:

digital logic having multiple logical elements that receive one or more data inputs and calculate both internal results for use as inputs to other logical elements within the stage and final results for use as inputs to logical elements in a next stage;

an internal completion signal generator, coupled with the digital logic, that detects completion by the digital logic of an internal result, and in response generates a completion signal for the internal result detected; and a done signal generator that receives the completion signals, and in response to a preselected one of the completion signals, generates a done signal with a predetermined delay, wherein the predetermined delay is at least as long as a maximum delay until the one or more data outputs are calculated.

5. The stage according to claim 4, wherein the do ne signal generator further comprises:

a plurality of join elements, wherein each join element receives one of the completion signals and in response provides an intermediate done signal, there being a plurality of intermediate done signals;

a first-of element, responsive to one of the plurality of intermediate done signals, that generates said done signal.

6. The stage according to claim 5 wherein the first-of element is an OR gate.

7. The stage according to claim 5 wherein the first-of element is a one-all gate.

8. The stage according to claim 4, wherein each completion signal includes a delay.

9. The stage according to claim 4 wherein each completion signal includes a plurality of intermediate data signals.

10. In a stage in a multi-stage, self-timed datapath circuit, wherein a datapath output is a function of one or more datapath inputs, a control circuit comprising:

an internal completion signal generator, coupled with the digital logic, that detects completion by the digital logic of an intermediate result of the multi-step calculation, and in response generates a completion signal; and a done signal generator, responsive to the completion signal, that generates a done signal with a predetermined delay, said predetermined delaying being at least as long as a maximum time for the data logic to calculate the datapath output.

11. In a stage of a multi-stage, self-timed datapath circuit, wherein the stage includes logical elements that calculate both internal results for use as inputs to other logical elements within the stage and final results for use as inputs to other logical elements in a next stage, a method of predicting a total stage calculation comprising the steps of:

dividing the logic elements into multiple sections, each section performing a part of the total stage calculation to generate an internal result;

selecting at least one section;

monitoring the at least one selected section for the internal result; and in response to the internal result, generating a completion signal with a delay that is at least as long as a maximum time for the logic elements to calculate a complete set of final results.

* * * * *